US012693887B2

(12) United States Patent　　(10) Patent No.:　US 12,693,887 B2
Chao et al.　　(45) Date of Patent:　Jul. 28, 2026

(54) LONG DURATION ASYNCHRONOUS TRANSACTION MONITORING OF DISTRIBUTED SYSTEMS

(71) Applicant: Dell Products L.P., Round Rock, TX (US)

(72) Inventors: Ching-Yun Chao, Austin, TX (US); Kay Hewett, Miami Beach, FL (US); William Corlett, Tampa, FL (US); Nikhil Shingte, Alpharetta, GA (US); Oluwadamilola Okuneye, Severn, MD (US); Susmitha Pillarisetty, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 602 days.

(21) Appl. No.: 17/974,574

(22) Filed: Oct. 27, 2022

(65) Prior Publication Data

US 2024/0143385 A1　　May 2, 2024

(51) Int. Cl.
　　*G06F 9/46*　　(2006.01)
　　*G06F 9/38*　　(2018.01)
　　*G06F 9/445*　　(2018.01)
(52) U.S. Cl.
　　CPC ............ *G06F 9/466* (2013.01); *G06F 9/3871* (2013.01); *G06F 9/44505* (2013.01)
(58) Field of Classification Search
　　CPC .... G06F 9/466; G06F 9/3871; G06F 9/44505; G06F 9/45558; G06F 2009/45591; G06Q 10/06
　　See application file for complete search history.

(56) References Cited

U.S. PATENT DOCUMENTS

| | | | | |
|---|---|---|---|---|
| 10,445,738 B1 * | 10/2019 | Waters | .................. | H04L 41/145 |
| 2009/0216874 A1 * | 8/2009 | Thain | ..................... | H04L 43/04 |
| | | | | 709/224 |
| 2011/0145657 A1 * | 6/2011 | Bishop | ............... | H04L 63/1433 |
| | | | | 714/47.1 |
| 2014/0075005 A1 * | 3/2014 | Tung | ................... | G06F 11/3006 |
| | | | | 709/223 |
| 2019/0052699 A1 * | 2/2019 | Wright | ................... | G06F 9/546 |
| 2020/0409933 A1 * | 12/2020 | Ertl | .................. | G06Q 10/06375 |
| 2024/0012676 A1 * | 1/2024 | Srivastava | ........... | G06N 3/0475 |

OTHER PUBLICATIONS

Dynatrace, Transaction Monitoring, downloaded from the Internet, Feb. 2024.
Camunda, Process Orchestration for end-to-end automation, downloaded from the Internet, Feb. 2024.

* cited by examiner

*Primary Examiner* — Kenneth Tang
(74) *Attorney, Agent, or Firm* — Terrile, Cannatti & Chambers, LLP; Stephen A. Terrile

(57) ABSTRACT

A system, method, and computer-readable medium for performing a data center management and monitoring operation. The data center management and monitoring operation includes: identifying a plurality of transaction components within a data center; monitoring the plurality of transaction components; identifying a long duration transaction based upon the monitoring; and, generating an insight regarding the long duration transaction.

20 Claims, 8 Drawing Sheets

LONG DURATION ASYNCHRONOUS TRANSACTION MONITORING OF DISTRIBUTED SYSTEMS

BACKGROUND OF THE INVENTION

Field of the Invention

The present invention relates to information handling systems. More specifically, embodiments of the invention relate to performing a data center monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center management and monitoring operation, comprising: identifying a plurality of transaction components within a data center; monitoring the plurality of transaction components; identifying a long duration transaction based upon the monitoring; and, generating an insight regarding the long duration transaction.

In another embodiment the invention relates to a system comprising: a processor; a data bus coupled to the processor; a data center asset client module; and, a non-transitory, computer-readable storage medium embodying computer program code, the non-transitory, computer-readable storage medium being coupled to the data bus, the computer program code interacting with a plurality of computer operations and comprising instructions executable by the processor and configured for: identifying a plurality of transaction components within a data center; monitoring the plurality of transaction components; identifying a long duration transaction based upon the monitoring; and, generating an insight regarding the long duration transaction.

In another embodiment the invention relates to a computer-readable storage medium embodying computer program code, the computer program code comprising computer executable instructions configured for: identifying a plurality of transaction components within a data center;

monitoring the plurality of transaction components; identifying a long duration transaction based upon the monitoring; and, generating an insight regarding the long duration transaction.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
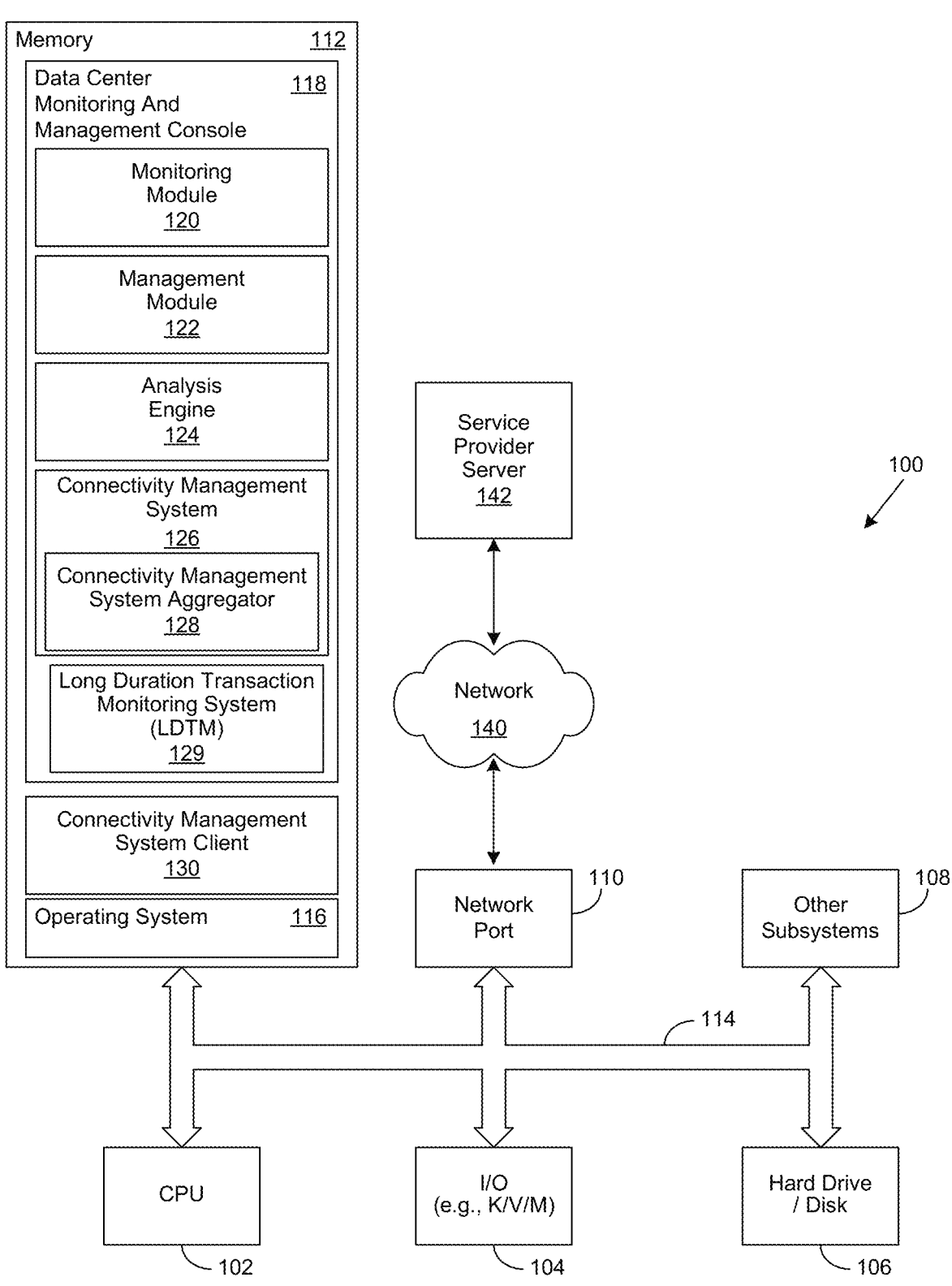
FIG. 1 shows a general illustration of components of an information handling system as implemented in the system and method of the present invention.

A system, method, and computer-readable medium are disclosed for performing a connectivity management operation. Various aspects of the invention reflect an appreciation that it is common for a typical data center to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads.

Certain aspects of the invention likewise reflect an appreciation that the use of cloud-based data center management systems often proves to be advantageous as they allow monitoring and management functions to be performed from anywhere, at any time, according to the user's particular needs, and typically at a reduced cost. However, various aspects of the invention likewise reflect an appreciation that the use of such cloud-based approaches may pose certain challenges. For example, communication channels are typically one-way and hindered by firewalls, proxies, and complicated network set-ups. Accordingly, certain aspects of the invention reflect an appreciation there is a need for an always-connected, bidirectional connection to managed data center assets located on the customer's premises such that management actions can be securely performed in real-time.

A system, method, and computer-readable medium are disclosed to dynamically beginning mitigation solutions across long duration asynchronous transactions. Multi-system business processes, which can be considered long duration asynchronous transactions, can often take days, weeks, or months to complete. As such, these transactions complex and can be difficult to diagnose when problems occur. For example, business processes handled by RESTful web services can be delayed by network failures, web service error conditions, or opaque delays from a black box system. Accordingly, a system, method, and computer-readable medium are disclosed for performing a long duration transaction monitoring operation. In certain embodiments, some or all of the transactions may be asynchronous. A long duration transaction monitoring operation enhances the notifications of potential incidents or delays to business processes allowing for quicker mitigation or ready explanation with the customer.

Various aspects of the present disclosure include an appreciation that known application performance monitoring and distributed tracing tools observe and detect anomalies in synchronous operations and limited asynchronous workflows. A deficiency with known solutions exists in the monitoring of long duration asynchronous operations, especially for distributed, multi-tier, multiple spanning system designs. In certain embodiments, the long duration transaction monitoring operation monitors the health and performance of multi-step asynchronous and long duration operations, such as new order processing until order fulfillment and identity federation using a single sign-on to a partner portal. In certain embodiments, the long duration transaction monitoring operation detects time-out, blocking, and fatal conditions and then triggers automated mitigation action when integrated with an incident orchestration solution.

In certain embodiments, the long duration transaction monitoring operation provides monitoring of a plurality of systems or applications within a distributed architecture for asynchronous workflows with dynamic mitigation functionality for internally instrumented or external, but still business process dependent, workflows. When compared with known monitoring tools such as Dynatrace or Splunk which observe individual microservices with a narrow myopic view, the long duration transaction monitoring operation functions in cloud computing environments, with multiple systems on customer premise or in a multi-cloud ecosystem run in geographically distinct locations. With these types of environments, it is desirable to provide end-to-end asynchronous monitoring and instrumentation.

In certain embodiments, the long duration transaction monitoring operation extends monitoring through instrumentation across services with different programming languages such as Java, Python, C++, and .NET. In certain embodiments, the long duration transaction monitoring operation is configurable to monitor software development kit (SDK) processes, instrumentation using Java agents and processes and Kubernetes daemon-based instrumentation. In certain embodiments, the long duration transaction monitoring operation generates a dashboard which depicts the instrumentation results showing the interaction of services and processes and displaying slow or failed transactions and nodes. Data collected from the monitoring service is then collated into an analysis engine to analyze for expected and common time boundaries. In certain embodiments, a long duration asynchronous transaction that falls out of bounds of the expected and common time boundaries is routed to an incident orchestrator for mitigation actions.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, an analysis engine 124, a connectivity management system (CMS) 126, a long duration transaction monitoring system 129 and a CMS client 130, or a combination thereof. In certain embodiments, the CMS 126 may be implemented to include a CMS aggregator 128. In certain embodiments, the data center monitoring and management console 118 may be implemented to perform a data center monitoring and management operation. In certain embodiments, the information handling system 100 may be implemented to include either a CMS 126, or a CMS client 130, or both.

In certain embodiments, the data center monitoring and management operation may be performed during operation of an information handling system 100. In various embodiments, performance of the data center monitoring and management operation may result in the realization of improved monitoring and management of certain data center assets, as described in greater detail herein. In certain embodiments, the CMS 126 may be implemented in combination with the CMS client 130 to perform a connectivity management operation, described in greater detail herein. As an example, the CMS 126 may be implemented on one information handling system 100, while the CMS client 130 may be implemented on another, as likewise described in greater detail herein.

Figure 2:
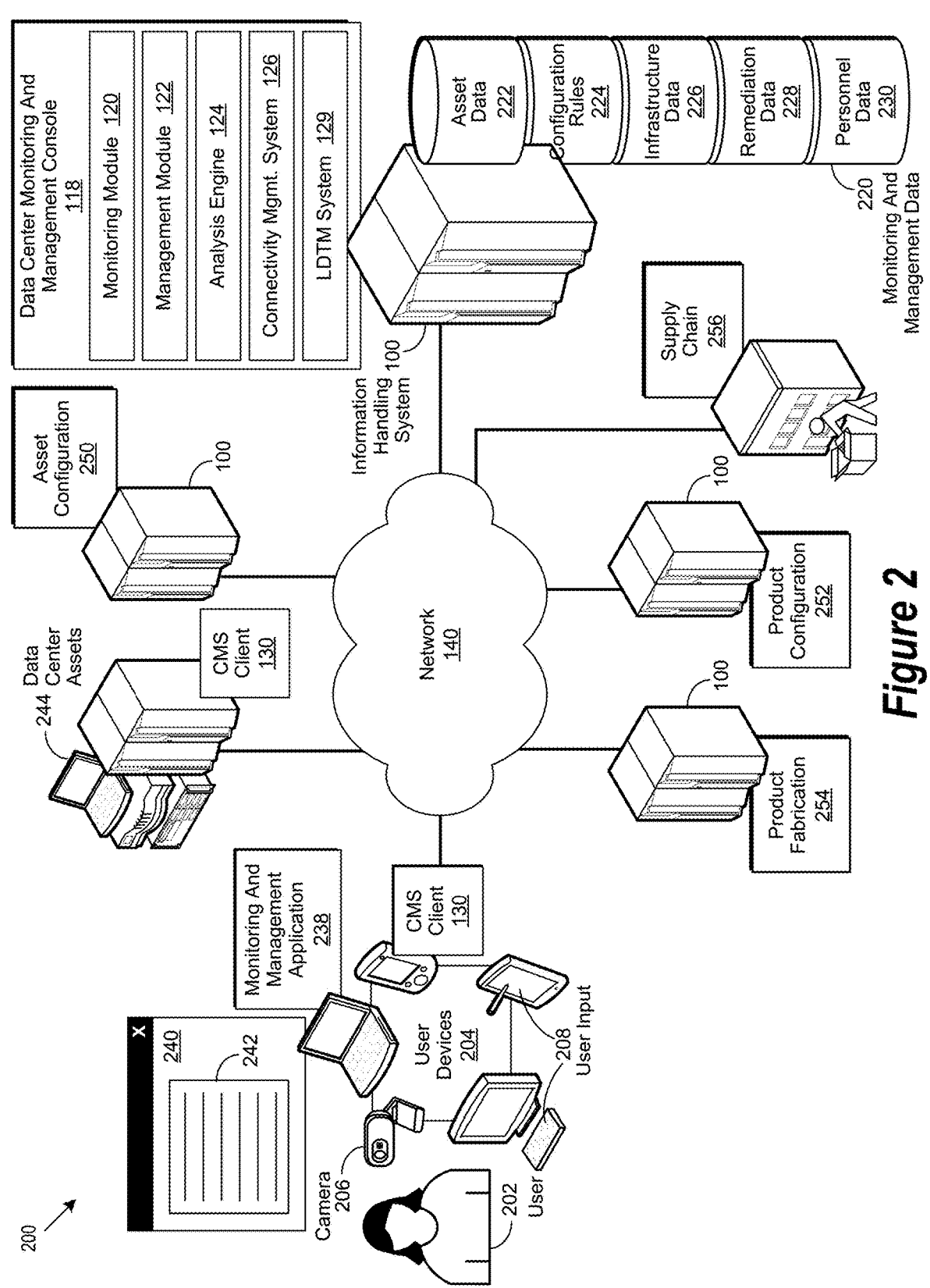
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything, tangible or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software applications, software services, firmware code, and other non-physical, computer-based assets. Other examples of intangible data center assets 244 may include digital assets, such as structured and unstructured data of all kinds, still images, video images, audio recordings of speech and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the definition of such parameters, and the method by which they may be selected, is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, a connectivity management operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

Likewise, as used herein, a connectivity management operation (also referred to as a data center connectivity management operation) broadly refers to any task, function, procedure, or process performed, directly or indirectly, to manage connectivity between a particular data center asset 244 and a particular data center monitoring and management console 118. In various embodiments, one or more connectivity management operations may be performed to ensure that data exchanged between a particular data center asset 244 and a particular data center monitoring and management console 118 during a communication session is secured. In certain of these embodiments, as described in greater detail herein, various cryptographic approaches familiar to skilled practitioners of the art may be used to secure a particular communication session.

In certain embodiments, the data center monitoring and management console 118 may be implemented to receive an alert corresponding to a particular data center issue. In various embodiments, the data center monitoring and management console 118 may be implemented to receive certain data associated with the operation of a particular data center asset 244. In certain embodiments, such operational data may be received through the use of telemetry approaches familiar to those of skill in the art. In various embodiments, the data center monitoring console 118 may be implemented to process certain operational data received from a particular data center asset to determine whether a data center issue has occurred, is occurring, or is anticipated to occur.

In certain embodiments, the data center monitoring and management console 118 may be implemented to include a monitoring module 120, a management monitor 122, an analysis engine 124, and a connectivity management system (CMS) 126, a long duration transaction monitoring system 129 or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle. In certain embodiments, a data center monitoring and management operation may include a long duration transaction monitoring operation. In certain embodiments, the long duration transaction monitoring system 129 described in greater detail herein may be implemented to perform a long duration transaction monitoring operation. As used herein, a long duration transaction monitoring operation broadly refers to a monitoring operation which monitors operational data from a plurality of transaction components, some of which may be components which do not communicate with the long duration transaction monitoring system 129. In certain embodiments, a long duration transaction monitoring operation includes identifying a plurality of transaction components within a data center, monitoring the plurality of transaction components, identifying a long duration transaction based upon the monitoring and, generating an insight regarding the long duration transaction. In certain embodiments, some or all of a long duration transaction monitoring operation is performed via a data center service 432. In certain embodiments some or all of a long duration transaction monitoring operation is a cloud-based service.

In various embodiments, the monitoring module 120, the management module 122, the analysis engine 124, the CMS 126 and the long duration transaction monitoring system 129 may be implemented, individually or in combination with one another, to perform a data center asset monitoring and management operation, as likewise described in greater detail herein. In various embodiments, a CMS client 130 may be implemented on certain user devices 204, or certain data center assets 244, or a combination thereof. In certain embodiments, the CMS 126 may be implemented in combination with a particular CMS client 130 to perform a connectivity management operation, as described in greater detail herein.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 220, data center asset configuration rules 224, data center infrastructure data 226, data center remediation data 228, and data center personnel data 230.

As used herein, data center asset data 222 broadly refers to information associated with a particular data center asset 244, such as an information handling system 100, or an associated workload, that can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload.

In certain embodiments, the data center asset data 222 may include information associated with data center asset 244 types, quantities, locations, use types, optimization types, workloads, performance, support information, and cost factors, or a combination thereof, as described in greater detail herein. In certain embodiments, the data center asset data 222 may include information associated with data center asset 244 utilization patterns, likewise described in greater detail herein. In certain embodiments, the data center asset data 222 may include information associated with the allocation of certain data center asset resources, described in greater detail herein, to a particular workload.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with performing a data center asset remediation operation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. In various embodiments, the data center remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of data center remediation data 228 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform an analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface. In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118.

In certain embodiments, a data center monitoring and management application 238 may be implemented on a particular user device 204. In various embodiments, the data center monitoring and management application 238 may be implemented on a mobile user device 204, such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
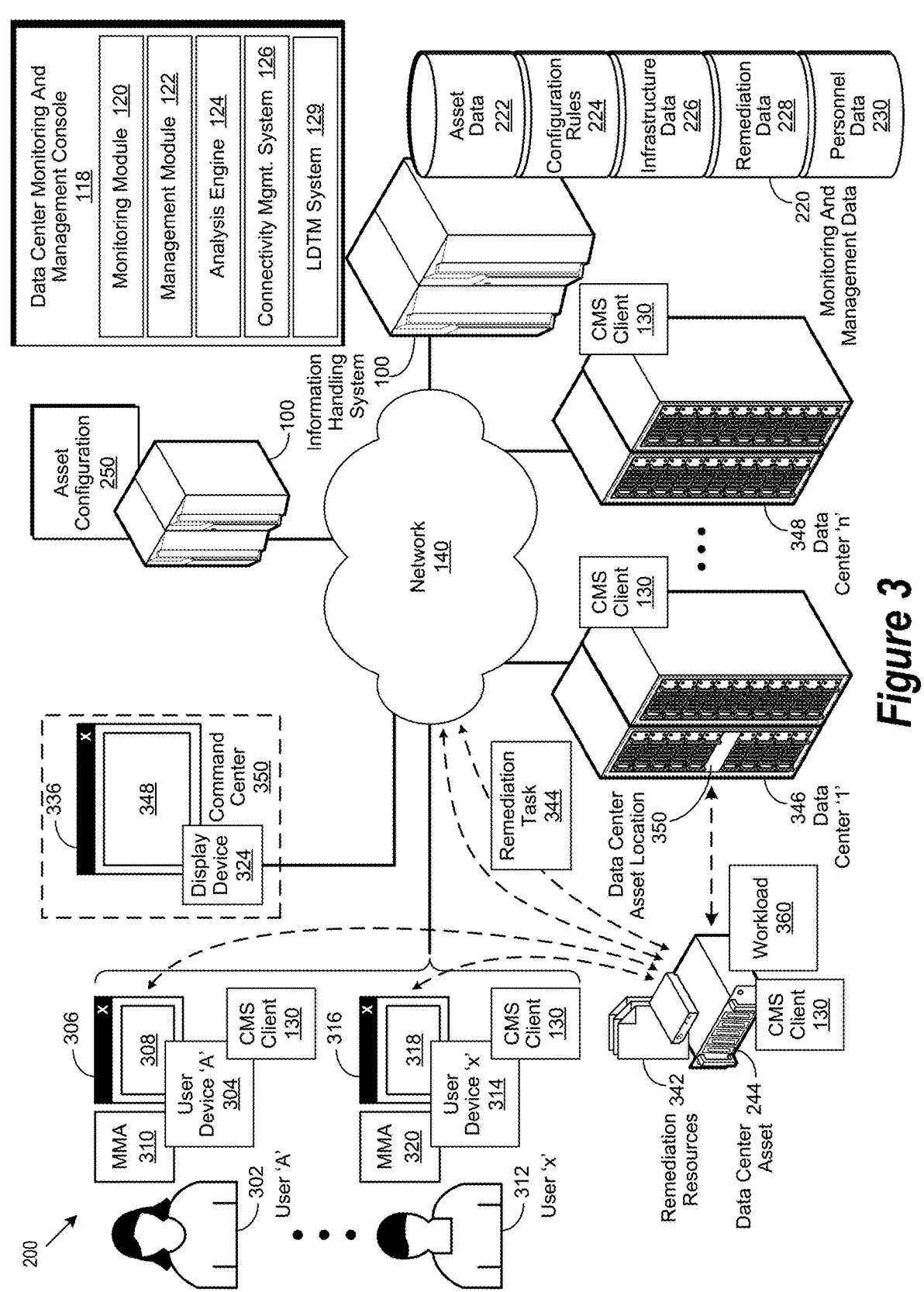
FIG. 3 shows a functional block diagram of the performance of certain data center monitoring and management operations.

FIG. 3 shows a functional block diagram of the performance of certain data center monitoring and management operations implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein.

In certain embodiments, a data center asset 244 may be implemented to process an associated workload 360. A workload 360, as used herein, broadly refers to a measure of information processing that can be performed by one or more data center assets 244, individually or in combination with one another, within a data center monitoring and management environment 200. In certain embodiments, a workload 360 may be implemented to be processed in a virtual machine (VM) environment, familiar to skilled practitioners of the art. In various embodiments, a workload 360 may be implemented to be processed as a containerized workload 360, likewise familiar to those of skill in the art.

In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, an analysis engine 124, and a connectivity management system (CMS) 126, a long duration transaction monitoring system 129 or a combination thereof, as described in greater detail herein. In various embodiments, a CMS client 130, described in greater detail herein may be implemented on certain user devices 'A' 304 through 'x' 314, or certain data center assets 244, or within data centers '1' 346 through 'n' 348, or a combination thereof. In certain embodiments, the CMS 126 may be implemented in combination with a particular CMS client 130 to perform a connectivity management operation, as likewise described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application (MMA) 310 through 320, described in greater detail herein, may be respectively implemented on user devices 'A' 304 through 'x' 314. In certain embodiments the UI window 306 through 316 may be respectively implemented as a UI window of the data center MMA 310 through 320. In certain embodiments, the data center MMA 310 through 320 may be implemented to interact in combination with the data center monitoring and management console 118, and other components of the data center monitoring and management environment 200, to perform a data center monitoring and management operation.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 348 within a UI window 336.

In certain embodiments, the display device 324 may be implemented in a command center 350, familiar to those of skill in the art, such as a command center 350 typically found in a data center or a network operations center (NOC). In various embodiments, one or more of the users 'A' 302 through 'x' 312 may be located within the command center 350. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data center asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244, or an associated workload 360, in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center monitoring and management console 118 may be implemented to operate in a monitoring mode. As used herein, monitoring mode broadly refers to a mode of operation where certain monitoring information provided by the monitoring and management console 118 is available for use by one or more users 'A' 302 through 'x' 312. In certain embodiments, one or more of the users 'A' 302 through 'x' 312 may be command center 350 users. In certain embodiments, the data center monitoring and management console 118 may be implemented to operate in a management mode. As used herein, management mode broadly refers to a mode of operation where certain operational functionality of the data center monitoring and management console 118 is available for use by a user, such as users 'A' 302 through 'x' 312.

Figure 4:
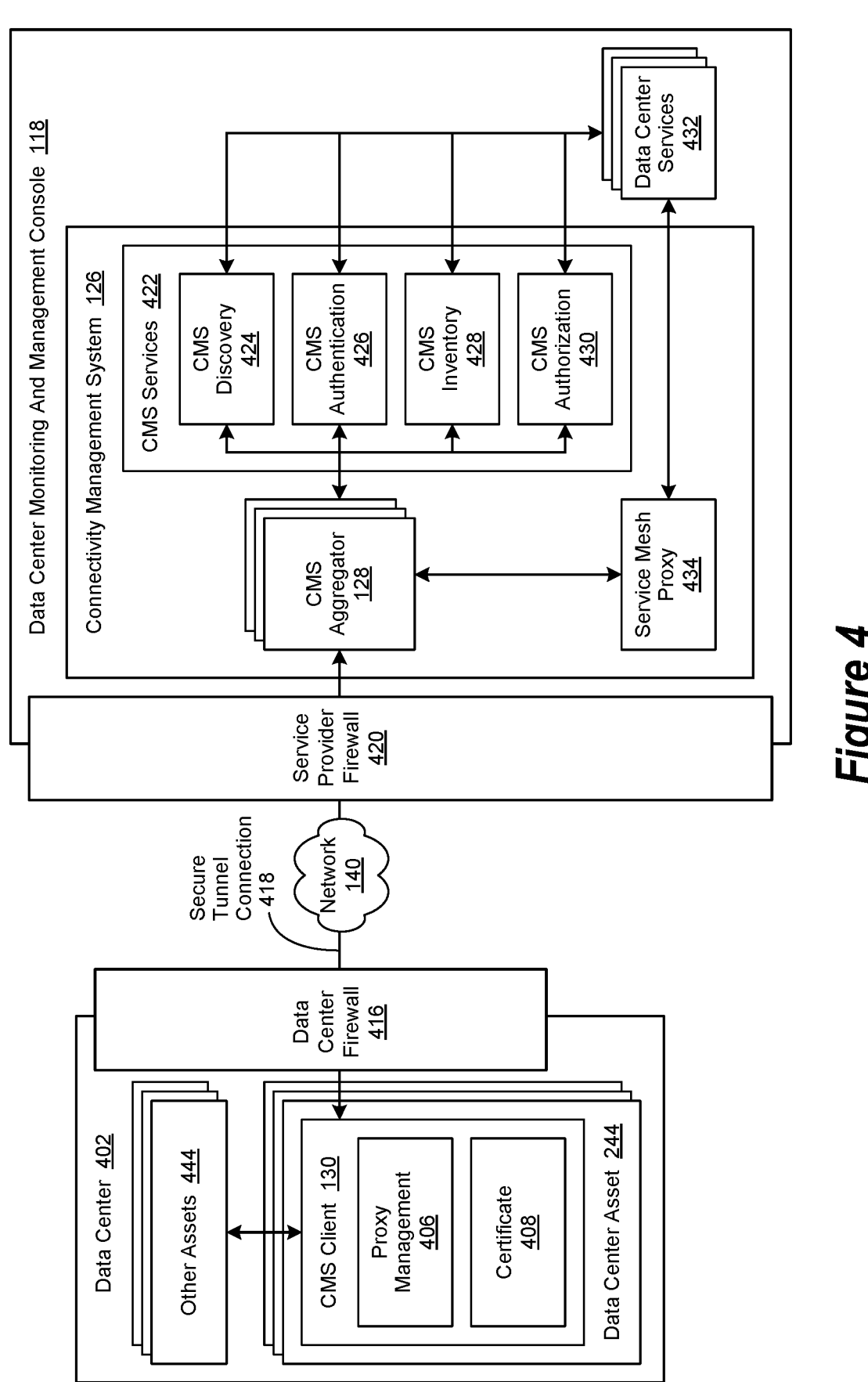
FIG. 4 shows a block diagram of a connectivity management system (CMS)

FIG. 4 shows a block diagram of a connectivity management system implemented in accordance with an embodiment of the invention. In various embodiments, a data center monitoring and management console 118, described in greater detail herein, may be implemented to include a connectivity management system (CMS) 126. In certain embodiments, the CMS 126 may be implemented in combination with a CMS client 130 to perform a connectivity management operation, likewise described in greater detail herein. In various embodiments, one or more connectivity management operations may be performed to initiate, and manage, secure, bi-directional, real-time connectivity between a data center monitoring and management console 118 and a particular data center asset 244, each of which are likewise described in greater detail herein.

In various embodiments, the data center monitoring and management console 118 may be implemented in a cloud environment familiar to skilled practitioners of the art. In certain of these embodiments, the operator of the data center monitoring and management console 118 may offer its various functionalities and capabilities in the form of one or more or more cloud-based data center services 432, described in greater detail herein. In various embodiments, one or more data center assets 244 may be implemented within a data center 402, likewise described in greater detail herein. In certain of these embodiments, the data center 402 may reside on the premises of a user of one or more data center services 432 provided by the operator of the data center monitoring and management console 118.

In various embodiments, the connectivity management system 126 may be implemented to include one or more CMS aggregators 128, one or more CMS services 422, and a service mesh proxy 434, or a combination thereof. In various embodiments, the CMS aggregator 128 may be implemented to interact with one or more of the CMS services 422, as described in greater detail herein. In various embodiments, the data center services 432 may likewise be implemented to interact with one or more of the CMS services 422, and the service mesh proxy 434, or a combination thereof. In certain embodiments, the CMS services 422 may be implemented to include a CMS discovery 424 service, a CMS authentication 426 service, a CMS inventory 428 service, and a CMS authorization 430 service, or a combination thereof.

In various embodiments, one or more data center assets 244 may be implemented within a data center 402, described in greater detail herein. In certain embodiments, the data center 402 may be implemented to include an associated data center firewall 416. In certain embodiments, a CMS client 130 may be implemented on one or more data center assets 244. In various embodiments, a CMS client 130 implemented on one data center asset 244 may likewise be implemented to enable one or more connectivity management operations associated with one or more other data center assets 444 that are not respectively implemented with their own CMS client 130. In certain of these embodiments, the CMS client 130 may be implemented to assume the identity, and attributes, of a particular data center asset it is directly, or indirectly, associated with.

In various embodiments, the CMS client 130 may be implemented with a proxy management module 406. In certain of these embodiments, the proxy management module 406 may be implemented to manage the CMS client's 130 connectivity to an external network 140 through an intermediary proxy server, or the data center firewall 416, or both. Those of skill in the art will be familiar with a proxy server, which as typically implemented, is a server application that acts as an intermediary between a client, such as a web browser, requesting a resource, such as a web page, from a provider of that resource, such as a web server.

In certain embodiments, the client of a proxy server may be a particular data center asset 244 requesting a resource, such as a particular data center service 432, from the data center monitoring and management console 118. Skilled practitioners of the art will likewise be aware that in typical proxy server implementations, a client may direct a request to a proxy server, which evaluates the request and performs the network transactions needed to forward the request to a designated resource provider. Accordingly, the proxy server functions as a relay between the client and a server, and as such acts as an intermediary.

Those of skill in the art will be aware that proxy servers also assist in preventing an attacker from invading a private network, such as one implemented within a data center 402 to provide network connectivity to, and between, certain data center assets 244. Skilled practitioners of the art will likewise be aware that server proxies are often implemented in combination with a firewall, such as the data center firewall 416. In such implementations, the proxy server, due to it acting as an intermediary, effectively hides an internal network from the Internet, while the firewall prevents unauthorized access by blocking certain ports and programs.

Accordingly, a firewall may be configured to allow traffic emanating from a proxy server to pass through to an external network 140, while blocking all other traffic from an internal network. Conversely, a firewall may likewise be configured to allow network 140 traffic emanating from a trusted source to pass through to an internal network, while blocking traffic from unknown or untrusted external sources. As an example, the data center firewall 416 may be configured in various embodiments to allow traffic emanating from the CMS client 130 to pass, while the service provider firewall 420 may be configured to allow traffic emanating from the CMS aggregator 128 to pass. Likewise, the service provider firewall 420 may be configured in various embodiments to allow incoming traffic emanating from the CMS client 130 to be received, while the data center firewall 416 may be configured to allow incoming network traffic emanating from the CMS aggregator 128 to be received.

In various embodiments, a particular CMS aggregator 128 may be implemented in combination with a particular CMS client 130 to provide a split proxy that allows an associated data center asset 244 to securely communicate with a data center monitoring and management console 118. In various embodiments, the split proxy may be implemented in a client/server configuration. In certain of these embodiments, the CMS client 130 may be implemented as the client component of the client/server configuration and the CMS aggregator 128 may be implemented as the server component. In certain of these embodiments, one or more connectivity management operations may be respectively performed by the CMS aggregator 128 and the CMS client 130 to establish a secure tunnel connection 418 through a particular network 140, such as the Internet.

In various embodiments, the secure tunnel connection 418 may be initiated by the CMS client 130 first determining the address of the CMS aggregator 128 it intends to connect to. In these embodiments, the method by which the address of the CMS aggregator 128 is determined is a matter of design choice. Once the address of the CMS aggregator 128 is determined, the CMS client 130 uses it to establish a secure Hypertext Transport Protocol (HTTPS) connection with the CMS aggregator 128 itself.

In response, the CMS aggregator 128 sets its HTTPS Transport Layer Security (TLS) configuration to "request TLS certificate" from the CMS client 130, which triggers the CMS client 130 to provide its requested TLS certificate 408. In certain embodiments, the CMS authentication 426 service may be implemented to generate and provision the TLS certificate 408 for the CMS client 130. In certain embodiments, the CMS client 130 may be implemented to generate a self-signed TLS certificate if it has not yet been provisioned with one from the CMS authentication 426 service.

In various embodiments, the CMS client 130 may then provide an HTTP header with a previously-provisioned authorization token. In certain embodiments, the authorization token may have been generated and provisioned by the CMS authentication 426 service once the CMS client has been claimed. As used herein, a claimed CMS client 130 broadly refers to a particular CMS client 130 that has been bound to an account associated with a user, such as a customer, of one or more data center services 432 provided by the data center monitoring and management console 118.

In certain embodiments, a CMS client 130 may be implemented to maintain its claimed state by renewing its certificate 408 and being provided an associated claim token. In these embodiments, the frequency, or conditions under which, a CMS client's certificate 408 is renewed, or the method by which it is renewed, or both, is a matter of design choice. Likewise, in these same embodiments, the frequency, or conditions under which, an associated claim token is generated, or the method by which it is provided to a CMS client 130, or both, is a matter of design choice.

In various embodiments, the CMS client 130 may be implemented to have a stable, persistent, and unique identifier (ID) after it is claimed. In certain of these embodiments, the CMS client's 130 unique ID may be stored within the authorization token. In these embodiments, the method by the CMS client's 130 unique ID is determine, and the method by which it is stored within an associated authorization token, is a matter of design choice.

Once the CMS client 130 has been claimed, it may be implemented to convert the HTTPS connection to a Websocket connection, familiar to those of skill in the art. After the HTTP connection has been converted to a Websocket connection, tunnel packet processing is initiated and the CMS aggregator 128 may then perform a Representational State Transfer (REST) request the CMS client 130 to validate its certificate 408. In certain embodiments, the validation of the CMS client's 130 certificate 408 is performed by the CMS authorization 430 service.

In various embodiments, the validation of the CMS client's 130 certificate 408 is performed to determine a trust level for the CMS client 130. In certain of these embodiments, if the CMS client's 130 certificate 408 is validated, then it is assigned a "trusted" classification. Likewise, if CMS client's 130 certificate 408 fails to be validated, then it is assigned an "untrusted" classification.

Accordingly, certain embodiments of the invention reflect an appreciation that "trusted" and "claimed," as used herein as they relate to a CMS client 130 are orthogonal. More specifically, "trust" means that the channel of communication can be guaranteed. Likewise, "claimed" the CMS client 130 can be authenticated and bound to a user, or customer, of one or more data center services 432 provided by the data center monitoring and management console 118.

In various embodiments, the resulting secure tunnel connection 418 may be implemented to provide a secure channel of communication through a data center firewall 416 associated with a particular data center 402 and a service provider firewall 420 associated with a particular data center monitoring and management console 118. In various embodiments, the CMS client 130, the secure tunnel connection 418, and the CMS aggregator 128 may be implemented to operate at the application level of the Open Systems Interconnection (OSI) model, familiar to those of skill in the art. Skilled practitioners of the art will likewise be aware that known approaches to network tunneling typically use the network layer of the OSI model. In certain embodiments, the CMS client 130 and the CMS aggregator 128 may be implemented to end logical events over the secure tunnel connection 418 to encapsulate and multiplex individual connection streams and associated metadata.

In various embodiments, the CMS discovery 424 service may be implemented to identify certain data center assets 244 to be registered and managed by the data center monitoring and management console 118. In various embodiments, the CMS discovery 424 service may be implemented to detect certain events published by a CMS aggregator 128. In certain embodiments, the CMS discovery 424 service may be implemented to maintain a database (not shown) of the respective attributes of all CMS aggregators 128 and CMS clients 130. In certain embodiments, the CMS discovery 424 service may be implemented to track the relationships between individual CMS clients 130 and the CMS aggregators 128 they may be connected to.

In various embodiments, the CMS discovery 424 service may be implemented to detect CMS client 130 connections and disconnections with a corresponding CMS aggregator 128. In certain of these embodiments, a record of such connections and disconnections is stored in a database (not shown) associated with the CMS inventory 428 service. In various embodiments, the CMS discovery 424 service may be implemented to detect CMS aggregator 128 start-up and shut-down events. In certain of these embodiments, a record of related Internet Protocol (IP) addresses and associated state information may is stored in a database (not shown) associated with the CMS inventory 428 service.

In various embodiments, the CMS authentication 426 service may be implemented to include certain certificate authority (CA) capabilities. In various embodiments, the CMS authentication 426 service may be implemented to generate a certificate 408 for an associated CMS client 130. In various embodiments, the CMS authentication 426 service may be implemented to use a third party CA for the generation of a digital certificate for a particular data center asset 244. In certain embodiments, the CMS inventory 428 service may be implemented to maintain an inventory of each CMS aggregator 128 by an associated unique ID. In certain embodiments, the CMS inventory 428 service may likewise be implemented to maintain an inventory of each CMS client 130 by an associated globally unique identifier (GUID).

In various embodiments, the CMS authorization 430 service may be implemented to authenticate a particular data center asset 244 by requesting certain proof of possession information, and then processing it once it is received. In certain of these embodiments, the proof of possession information may include information associated with whether or not a particular CMS client 130 possesses the private keys corresponding to an associated certificate 408. In various embodiments, the CMS authorization 430 service may be implemented to authenticate a particular CMS client 130 associated with a corresponding data center asset 244. In certain of these embodiments, the CMS authorization 430 service may be implemented to perform the authentication by examining a certificate 408 associated with the CMS client 130 to ensure that it has been signed by the CMS authentication 426 service.

In various embodiments, the service mesh proxy 434 may be implemented to integrate knowledge pertaining to individual data center assets 244 into a service mesh such that certain data center services 432 have a uniform method of transparently accessing them. In various embodiments, the service mesh proxy 434 may be implemented with certain protocols corresponding to certain data center assets 244. In certain embodiments, the service mesh proxy 434 may be implemented to encapsulate and multiplex individual connection streams and metadata over the secure tunnel connection 418. In certain embodiments, these individual connection streams and metadata may be associated with one or more data center assets 244, one or more data center services 432, one or more CMS clients 130, and one or more CMS aggregators 128, or a combination thereof.

Figure 5:
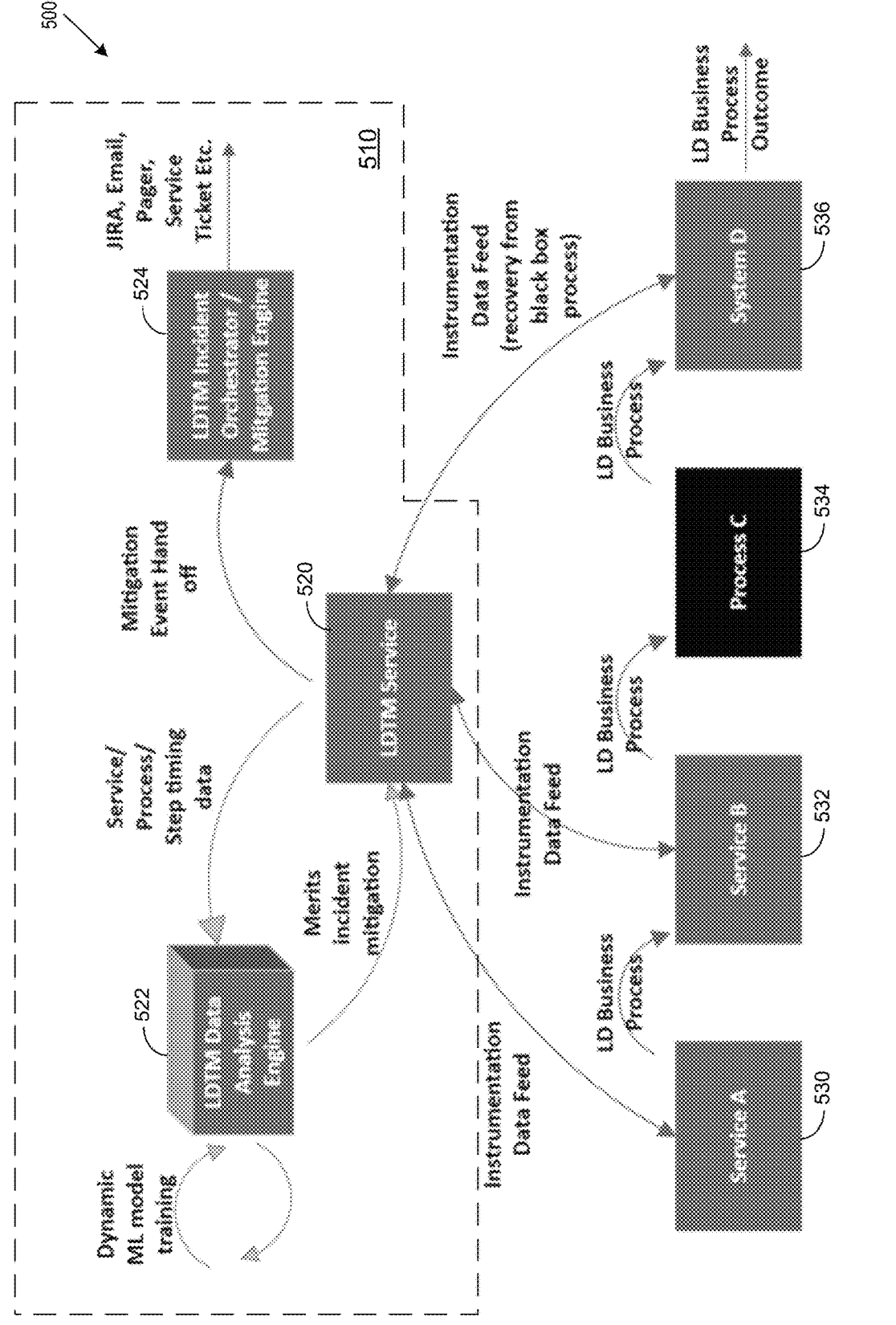
FIG. 5 shows a simplified block diagram of a long duration transaction monitoring service environment.

FIG. 5 shows a simplified block diagram of a long duration transaction monitoring service environment 500. In certain embodiments, the long duration transaction monitoring service environment 500 includes a long duration transaction monitoring system 510. In certain embodiments, the long duration transaction monitoring system 510 includes a long duration transaction monitoring service 520, a long duration transaction monitoring data analysis engine 522 and a long duration transaction monitoring incident orchestrator/migration engine 524. In certain embodiments, the long duration transaction monitoring system 510 performs a long duration transaction monitoring operation. In certain embodiments, performance of the long duration transaction monitoring operation results in generation of an insight regarding a monitored long duration transaction. In certain embodiments, the long duration transaction monitoring operation monitors a plurality of types of transaction. In certain embodiments, the plurality of types of transactions include one or more of transactions spanning a long duration (e.g., days or months), transactions requiring manual intervention, transactions spanning multiple clusters or systems, transactions involving external systems and transactions involving black box systems. In certain embodiments, the long duration transaction monitoring operation detects outcomes of the transactions. In certain embodiments, the outcomes include one or more of a time-out condition (i.e., a condition which takes longer than a predetermined amount of time to complete), a blocking condition (i.e., a condition which prevents the long duration transaction from proceeding to a next transaction) and fatal condition (i.e., a condition which causes the long duration transaction to crash) associated with the outcome of the transaction.

As used herein, a long duration transaction refers to a process which spans a plurality of transaction components. In certain embodiments, the long duration transaction generates a long duration business process outcome. As used herein, a transaction component broadly refers to a component which performs an action to generate a result. In certain embodiments, some or all of the transaction components are distributed (i.e., not contained within the same system) and thus may be considered distributed systems. In certain embodiments one or more actions or results of the plurality of transaction components are performed asynchronously (i.e., not simultaneous or concurrent in time). As such a long duration transaction may be an asynchronous long duration transaction.

Examples of transaction components include a service component, a process component and a system component. In certain embodiments, a transaction component included within or is executed by a data center asset. It will be appreciated that a long duration transaction may include any combination of service components, process components and system components. As used herein, a long duration business process outcome broadly refers to a final outcome of a plurality of long duration business process outcomes generated by a set of transaction components.

It will be appreciated that any combination of service components, process components and system components may interact with the long duration transaction monitoring system 510. In certain embodiments, transitions between transaction components can be via long duration processes. As used herein, a long duration process broadly refers to a process performed by a transaction component which is part of a set of processes spanning a plurality of transaction components providing a long duration transaction.

In certain embodiments, the long duration transaction monitoring service 520 provides one or more of service data, process data and step timing data to the long duration transaction monitoring data analysis engine 534. In certain embodiments, the long duration transaction monitoring analysis engine 522 provides analysis information to the long duration transaction monitoring service 520. In certain embodiments, the analysis information corresponds to an insight regarding a long duration transaction. In certain embodiments, the analysis information includes incident mitigation information. In certain embodiments, the incident mitigation information provides an indication that a certain incident merits incident mitigation. In certain embodiments, dynamic machine learning model training is used to train the long duration transaction monitoring data analysis engine 522. In certain embodiments the dynamic machine learning model training trains the long duration transaction monitoring data analysis engine 520 to determine when a particular service, process or incident merits incident mitigation. In certain embodiments, the dynamic machine learning model training performs a machine learning analysis of completion trends for a particular process. In certain embodiments, the long duration transaction monitoring system performs a remediation operation based upon the insight. In certain embodiments, the remediation operation corresponds to a data center remediation operation.

In certain embodiments, the long duration transaction monitoring service provides event control information to the long duration transaction monitoring incident orchestrator/mitigation engine 524. In certain embodiments, the event control information includes event hand off information. In certain embodiments, the event handoff information includes mitigation event handoff information. In certain embodiments, the long duration transaction monitoring incident orchestrator/mitigation engine generates an insight regarding a long duration transaction based upon the event control information. In certain embodiments, the long duration transaction monitoring incident orchestrator/mitigation engine 524 allows for more elaborate handling of mitigation triggering events, sending messages or assigning blame etc. Examples of triggering events include a software application specific tracking ticket such as a JIRA ticket, generating an email regarding an event, generating a pager message regarding an event, generating a service ticket regarding an event, etc. As used herein, elaborate handling of mitigation triggering events broadly refers to generation of a plurality of discrete mitigation triggering events. In certain embodiments, the generation of the plurality of discrete mitigation triggering events is performed automatically by the long duration transaction monitoring incident orchestrator/mitigation engine 524.

In certain embodiments, the long duration transaction monitoring service environment 500 includes one or more of a first service component 530 (Service A), a second service component 532 (Service B), a process component 534 (Process C) and a system component 536 (System D). In various embodiments, some or all of the first service component 530, the second service component 532, the process component 534 and the system component 536 interact with and communicate with the long duration transaction monitoring system 510. In certain embodiments, the first service component 530, the second service component 532, the process component 534 and the system component 536 provide a representative example of a long duration asynchronous process that spans multiple service processes. In certain embodiments, one or both of the first service component 530 and the second service component 532 are instrumented to provide information (such as process status information) to the long duration transaction monitoring system 510. In certain embodiments, this information is provided to the long duration transaction monitoring system 510 via an instrumentation data feed. In certain embodiments, the process component 534 represents a black boxed process. As used herein, a black boxed process refers to a process that does not include instrumentation or functionality to provide information to the long duration transaction monitoring system 510.

In certain embodiments, a block boxed process comprises an un-instrumented service, an external partner systems, or a manual process. In certain embodiments, a manual process often includes one or more human driven steps as part of a business process (colloquially referred to as a "sneaker net"). Examples of a human driven step might include the human action of walking down a hallway to manually resolve a step. The long duration transaction monitoring system 510 not only encounters and identifies these black box processes, but can derive information regarding the black box processes. In certain embodiments, the derived information includes a dynamic model of expected resolution of the black box processes. In certain embodiments, the derived information includes identifying resolution time-lines for outcomes of these black boxed processes. In certain embodiments, the long duration transaction monitoring data analysis engine 522 builds a dynamic model of expected resolution (including resolution timelines) for such processes. In certain embodiments, the system component 536 represents a separate internal system. As used herein, a separate internal system refers to a system which is internally controlled by a customer.

In certain embodiments, the data analysis engine 522, continually refines its model as the corpus of data ingested by the data analysis engine grows. In certain embodiments, the refinement is performed whether a process is fully instrumented or is an expected black box process. For example, if a process exceeds its expected reasonable time boundaries as calculated by the data analysis engine 522, the long duration transaction monitoring service 520 can initiate a mitigation action. In certain embodiments the mitigation action may be initiated from the incident orchestrator 524. In certain embodiments, the mitigation action can include one or more of an application specific issue tracking creation, a pager alert, a service ticket creation, etc.

Accordingly, the long duration transaction monitoring system 510 is capable of deriving information from ambiguous processes in a long duration transaction and can dynamically adjust mitigation triggers based on a growing dataset. Additionally, the long duration transaction monitoring system 510 generates an incentive process structure that learns about the environment being monitored. Such an incentivized process structure is described in more detail in the example shown in FIG. 7. Additionally, the long duration transaction monitoring system 510 tracks process breeches, such as service level agreement process breeches, and service errors across a span of multiple discrete, even siloed, transaction components including black box transaction components or manual transaction components.

Figure 6:
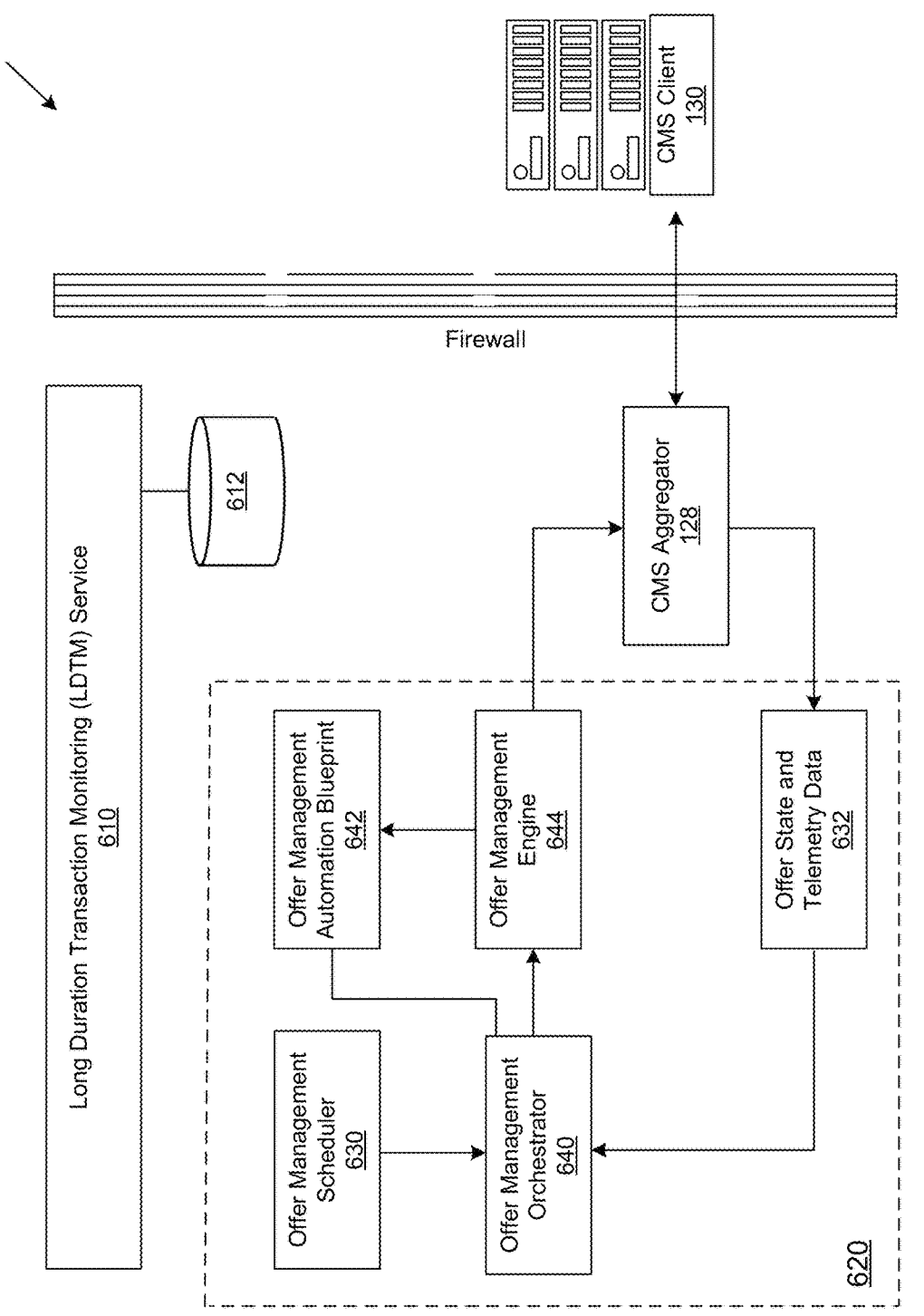
FIG. 6 shows a simplified block diagram of an active management operation which is included within a long duration asynchronous transaction monitoring operation.

FIG. 6 shows a simplified block diagram of a long duration transaction monitoring environment 600. In certain embodiments, the long duration transaction monitoring environment 600 performs an active management operation which is included with a long duration asynchronous transaction monitoring operation. More specifically, the long duration transaction monitoring environment 600 includes a long duration transaction monitoring service 610 which receives information from long duration transaction monitoring data repository 612 as well as an active management system 620. In various embodiments, the active management system 620 includes one or more of an offer management scheduler component 630, an offer state and telemetry data component 632, an offer management orchestrator 640, an offer management automation blueprint component 642 and an offer management engine 644. In various embodiments, some or all of the offer management scheduler component 630, the offer state and telemetry data component 632, the offer management orchestrator 640, the offer management automation blueprint component 642 and the offer management engine 644 provide information to the long duration transaction monitoring service 610. In various embodiments, some or all of the offer management scheduler component 630, the offer state and telemetry data component 632, the offer management orchestrator 640, the offer management automation blueprint component 642 and the offer management engine 644 are examples of transaction components.

When performing the active management operation which is included with a long duration asynchronous transaction monitoring operation the long duration transaction monitoring service 610 monitors long duration asynchronous transactions received from the offer management scheduler component 630, the offer state and telemetry data component 632, the offer management orchestrator 640, the offer management automation blueprint component 642 and the offer management engine 644 provide information to the long duration transaction monitoring service 610.

When performing the active management operation which is included with a long duration asynchronous transaction monitoring operation long duration transaction monitoring service 610 monitors asynchronous transaction that are received from beyond the firewall. In certain embodiments asynchronous transaction that are received from beyond the firewall are received via a CMS client 130 and a CMS aggregator 128.

Figure 7:
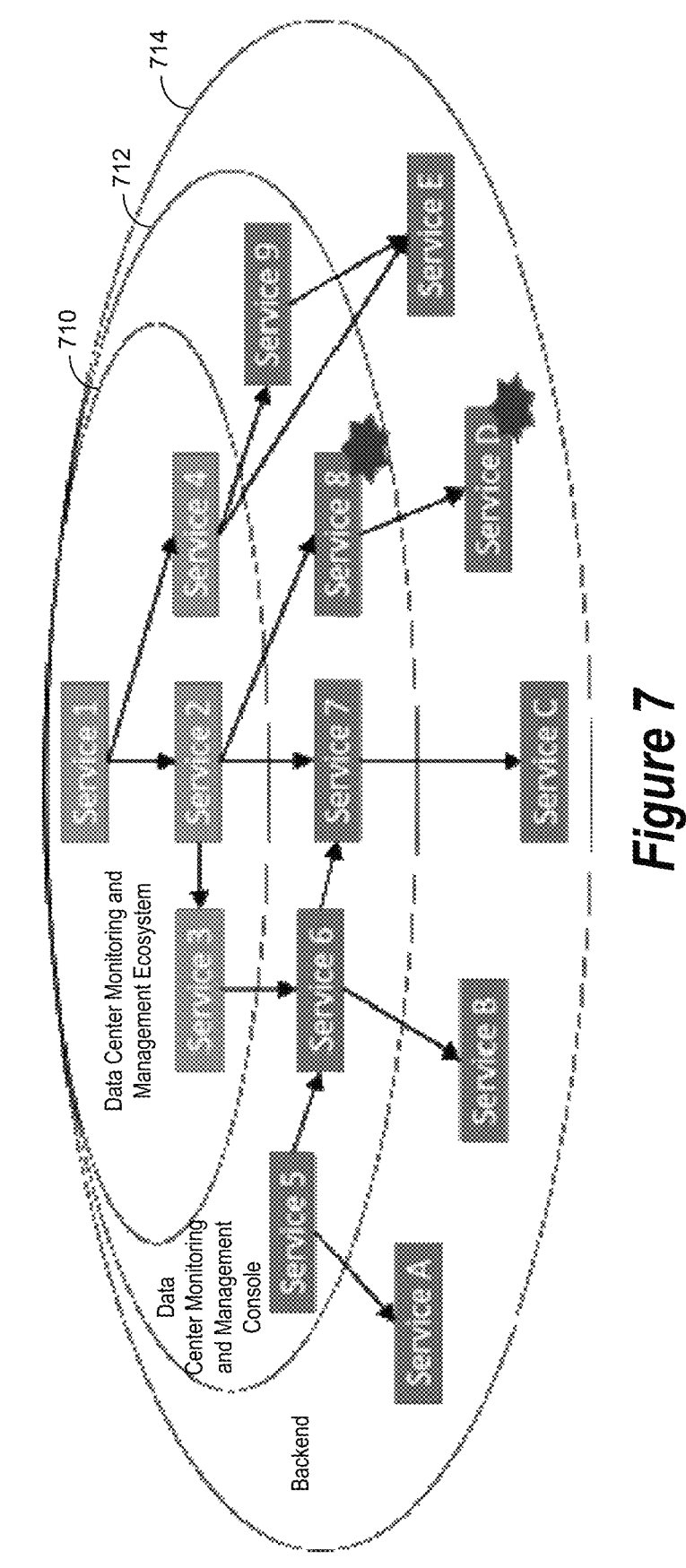
FIG. 7 shows a simplified block diagram of an incentivized instrumentation operation; and, FIG. 8 shows a block diagram of an order fulfillment operation that makes use of long duration asynchronous transaction monitoring data.

FIG. 7 shows a simplified block diagram of an example of incentivized instrumentation environment 700. In certain embodiments, the incentivized instrumentation environment 700 includes one or more of a plurality of service tiers. In certain embodiments, the incentivized instrumentation environment 700 includes one or more of a front end service tier 710, a mid-tier service tier 712 and a backend service tier 714. In certain embodiments, the front end service tier is associated with a data center monitoring and management ecosystem. In certain embodiments, the mid-tier service tier 712 is associated with a data center monitoring and management console such as data center monitoring and management console 118. In certain embodiments, each of the plurality of service tiers includes one or more transaction components (e.g., services). In certain embodiments, the front end service tier 710 represent client side services where, for example, service 1 requests information from downstream services, service 2 and service 4.

Continuing the example, service 2 processes the request from service 1 and realizes it needs information from service 8, which in turn needs information from service d. If backend service d doesn't provide information needed by service 8, then service 8 cannot provide the information back to service 2. Service d might be a manual process or an online process which does not include instrumentation to communicate with the long duration transaction monitoring system 510. When a problem is encountered with one or more transaction components, mitigation can include assigning blame to the best understood offending step in the business transaction chain. As tickets are either automatically created via the incident orchestrator engine 524 or manually created. Assigning the blame to an uninstrumented transaction component provides a natural incentive to either fix the bottleneck or properly inform the long duration transaction monitoring system 510 through instrumentation where the blame lays. Thus, the long duration transaction monitoring operation includes an incentive driven instrumentation keeps the long duration monitoring system 510 learning about the systems being monitored. By assigning the blame of the failure to service 8 and service d, these services have a natural incentive to either fix the bottleneck or properly inform the long duration transaction monitoring system 510 through instrumentation where the blame lays.

Continuing the example, when service 2 does not receive the requested information from service 8, service 2 might instantiate a mitigation operation such as open service ticket against service 8. After happening a few times, service 8 has an incentive to instrument itself so it doesn't keep getting blamed for the failure of service d. By instrumenting the outgoing requests to the service gives that service incentive to provide its own instrumentation so as to not be blamed for future failures from services on which it depends. Increasing the instrumenting helps expand visibility for services further down the process chain.

Figure 8:
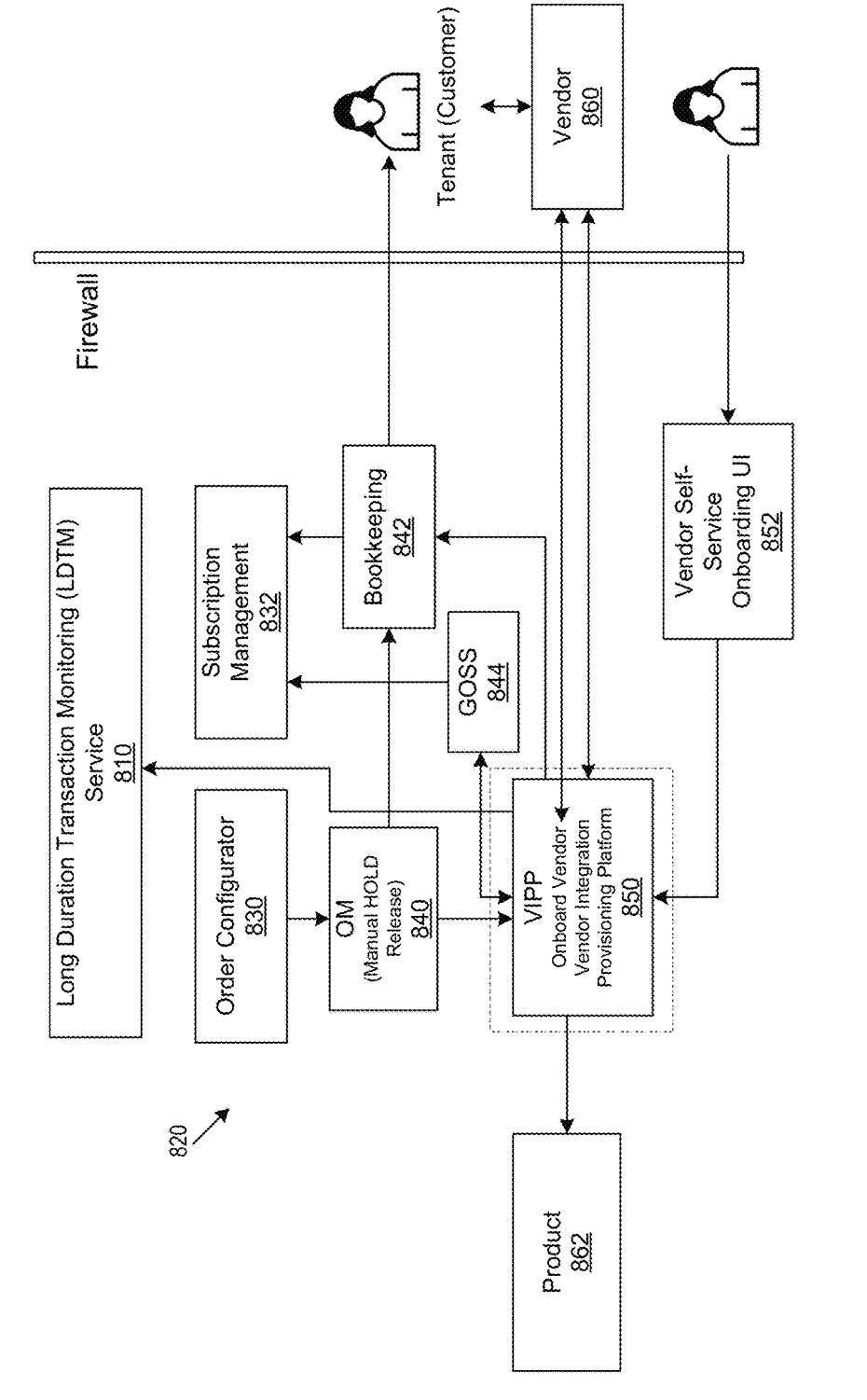

FIG. 8 shows a simplified block diagram of a long duration transaction monitoring environment 800. In certain embodiments, the long duration transaction monitoring environment 800 performs an order fulfillment operation which is included with a long duration asynchronous transaction monitoring operation.

More specifically, the long duration transaction monitoring environment 800 includes a long duration transaction monitoring service 810 as well as an order fulfillment system 820. In various embodiments, the order fulfillment system 820 includes one or more of an order configuration component 830, a subscription management component 832, an order management component 840, a bookkeeping component 842, an order status component 844 (e.g., a global order status service (GOSS)), a vendor integration and provisioning platform 850, a vendor self-service onboarding user interface component 852 and an offer management engine 844.

In various embodiments, some or all of the order configuration component 830, the subscription management component 832, the order management component 840, the bookkeeping component 842, the vendor integration and provisioning platform 850, the vendor self-service onboarding user interface component 852 and the offer management engine 844 communicate with the long duration transaction monitoring service 810. In various embodiments, some or all of the order configuration component 830, the subscription management component 832, the order management component 840, the bookkeeping component 842, the vendor integration and provisioning platform 850, the vendor self-service onboarding user interface component 852 and the offer management engine 844 are examples of transaction components.

In certain embodiments, a vendor 860 communicates with one or more components of the order fulfillment system 820. In certain embodiments, the order fulfillment system 820 produces a product such as a data center asset based upon the order fulfillment operation and the long duration transaction monitoring operation. In certain embodiments, the vendor 860 is external (e.g., on the other side of the firewall). In certain embodiments, the vendor 860 is treated as a black box transaction component by the long duration transaction monitoring service 810.

Accordingly, the long duration transaction monitoring service 810 provides an end-to-end monitoring and awareness of potential failure and mitigative options to business processes such as the data center asset order fulfillment. The long duration transaction monitoring service 810 evaluates the health and performance conditions of asynchronous, multi-step, long duration order processing and service provisioning transactions. The long duration transaction monitoring service 810 handles fulfillment cycles spanning several hours, days or weeks in duration such as accounts receivable and invoice generation. The long duration transaction monitoring service 810 triggers alerts upon failure conditions and automates mitigation actions.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center management and monitoring operation, comprising:

identifying a plurality of transaction components within a data center, each of the plurality of transaction components executing on a data center asset of the data center, each of the plurality of transaction components comprising a component, the component performing an action to generate a result, at least some of the plurality of transaction components being distributed within the data center;

monitoring, via a long duration transaction monitoring system, the plurality of transaction components, the long duration transaction monitoring system including a long duration transaction monitoring data analysis engine, a long duration transaction monitoring service and a long duration transaction monitoring incident orchestrator/mitigation engine, the long duration transaction monitoring service providing service data, process data and step timing data to the long duration transaction monitoring data analysis engine, the long duration transaction monitoring analysis engine providing analysis information to the long duration transaction monitoring service and event control information to the long duration transaction monitoring incident orchestrator/mitigation engine, the long duration transaction monitoring incident orchestrator/mitigation engine providing elaborate handling of mitigation triggering events, wherein the elaborate handling of mitigation triggering events refers to generating a plurality of discrete mitigation triggering events;

identifying, via the long duration transaction monitoring system, a long duration transaction based upon the monitoring, wherein the long duration transaction refers to a process which spans the plurality of transaction components; and, generating, via the long duration transaction monitoring system, an insight regarding the long duration transaction.

2. The method of claim 1, wherein:

the long duration transaction comprises an asynchronous long duration transaction.

3. The method of claim 1, further comprising:

performing, via the long duration transaction monitoring system, a remediation operation based upon the insight.

4. The method of claim 1, further comprising:

generating, via the long duration transaction monitoring system, analysis information based upon the monitoring, the analysis information including incident mitigation information.

5. The method of claim 1, further comprising:

generating, via the long duration transaction monitoring system, a triggering event based upon the monitoring.

6. The method of claim 1, wherein:

the identifying the plurality of transaction components includes identifying a black box transaction component; and, the monitoring the plurality of transaction components includes deriving information regarding the black box transaction component.

7. A system comprising:

a processor;

a data bus coupled to the processor;

a data center asset client module; and, a non-transitory, computer-readable storage medium embodying computer program code, the non-transitory, computer-readable storage medium being coupled to the data bus, the computer program code interacting with a plurality of computer operations and comprising instructions executable by the processor and configured for:

identifying a plurality of transaction components within a data center, each of the plurality of transaction components executing on a data center asset of the data center, each of the plurality of transaction components comprising a component, the component performing an action to generate a result, at least some of the plurality of transaction components being distributed within the data center;

monitoring, via a long duration transaction monitoring system, the plurality of transaction components, the long duration transaction monitoring system including a long duration transaction monitoring data analysis engine, a long duration transaction monitoring service and a long duration transaction monitoring incident orchestrator/mitigation engine, the long duration transaction monitoring service providing service data, process data and step timing data to the long duration transaction monitoring data analysis engine, the long duration transaction monitoring analysis engine providing analysis information to the long duration transaction monitoring service and event control information to the long duration transaction monitoring incident orchestrator/mitigation engine, the long duration transaction monitoring incident orchestrator/mitigation engine providing elaborate handling of mitigation triggering events, wherein the elaborate handling of mitigation triggering events refers to generating a plurality of discrete mitigation triggering events;

identifying, via the long duration transaction monitoring system, a long duration transaction based upon the monitoring, wherein the long duration transaction refers to a process which spans the plurality of transaction components; and, generating, via the long duration transaction monitoring system, an insight regarding the long duration transaction.

8. The system of claim 7, wherein:
the long duration transaction comprises an asynchronous long duration transaction.

9. The system of claim 7, wherein the instructions executable by the processor are further configured for:
performing, via the long duration transaction monitoring system, a remediation operation based upon the insight.

10. The system of claim 7, wherein the instructions executable by the processor are further configured for:
generating, via the long duration transaction monitoring system, analysis information based upon the monitoring, the analysis information including incident mitigation information.

11. The system of claim 7, wherein the instructions executable by the processor are further configured for:
generating, via the long duration transaction monitoring system, a triggering event based upon the monitoring.

12. The system of claim 7, wherein:
the identifying the plurality of transaction components includes identifying a black box transaction components; and,
the monitoring the plurality of transaction components includes deriving information regarding the black box transaction component.

13. A non-transitory, computer-readable storage medium embodying computer program code, the computer program code comprising computer executable instructions configured for:
identifying a plurality of transaction components within a data center, each of the plurality of transaction components executing on a data center asset of the data center, each of the plurality of transaction components comprising a component, the component performing an action to generate a result, at least some of the plurality of transaction components being distributed within the data center;

monitoring, via a long duration transaction monitoring system, the plurality of transaction components, the long duration transaction monitoring system including a long duration transaction monitoring data analysis engine, a long duration transaction monitoring service and a long duration transaction monitoring incident orchestrator/mitigation engine, the long duration transaction monitoring service providing service data, process data and step timing data to the long duration transaction monitoring data analysis engine, the long duration transaction monitoring analysis engine providing analysis information to the long duration transaction monitoring service and event control information to the long duration transaction monitoring incident orchestrator/mitigation engine, the long duration transaction monitoring incident orchestrator/mitigation engine providing elaborate handling of mitigation triggering events, wherein the elaborate handling of mitigation triggering events refers to generating a plurality of discrete mitigation triggering events;

identifying, via the long duration transaction monitoring system, a long duration transaction based upon the monitoring, wherein the long duration transaction refers to a process which spans the plurality of transaction components; and, generating, via the long duration transaction monitoring system, an insight regarding the long duration transaction.

14. The non-transitory, computer-readable storage medium of claim 13, wherein:
the long duration transaction comprises an asynchronous long duration transaction.

15. The non-transitory, computer-readable storage medium of claim 13, wherein the computer executable instructions are further configured for:
performing, via the long duration transaction monitoring system, a remediation operation based upon the insight.

16. The non-transitory, computer-readable storage medium of claim 13, wherein the computer executable instructions are further configured for:
generating, via the long duration transaction monitoring system, analysis information based upon the monitoring, the analysis information including incident mitigation information.

17. The non-transitory, computer-readable storage medium of claim 13, wherein the computer executable instructions are further configured for:
generating, via the long duration transaction monitoring system, a triggering event based upon the monitoring.

18. The non-transitory, computer-readable storage medium of claim 13, wherein:
the identifying the plurality of transaction components includes identifying a black box transaction components; and,
the monitoring the plurality of transaction components includes deriving information regarding the black box transaction component.

19. The non-transitory, computer-readable storage medium of claim 13, wherein:
the computer executable instructions are deployable to a client system from a server system at a remote location.

20. The non-transitory, computer-readable storage medium of claim 13, wherein:

the computer executable instructions are provided by a service provider to a user on an on-demand basis.

\* \* \* \* \*